(12) United States Patent
Sano et al.

(10) Patent No.: US 12,723,196 B2
(45) Date of Patent: Sep. 1, 2026

(54) PRODUCTION METHOD OF INORGANIC FLUORIDE LUMINESCENT MATERIAL

(71) Applicant: NICHIA CORPORATION, Anan (JP)

(72) Inventors: Yohei Sano, Yokohama (JP); Hiroomi Taguchi, Yokohama (JP)

(73) Assignee: NICHIA CORPORATION, Anan (JP)

( * ) Notice: Subject to any disclaimer, the term of this patent is extended or adjusted under 35 U.S.C. 154(b) by 744 days.

(21) Appl. No.: 18/000,280

(22) PCT Filed: May 20, 2021

(86) PCT No.: PCT/JP2021/019089
§ 371 (c)(1),
(2) Date: Nov. 29, 2022

(87) PCT Pub. No.: WO2021/241375
PCT Pub. Date: Dec. 2, 2021

(65) Prior Publication Data
US 2023/0142294 A1 May 11, 2023

(30) Foreign Application Priority Data
May 29, 2020 (JP) ................................ 2020-094474

(51) Int. Cl.
*C09K 11/61* (2006.01)
*C09K 11/57* (2006.01)

(52) U.S. Cl.
CPC .................................... *C09K 11/61* (2013.01)

(58) Field of Classification Search
CPC ....... C09K 11/61; C09K 11/08; C09K 11/616; C09K 11/617; C09K 11/615;
(Continued)

(56) References Cited

U.S. PATENT DOCUMENTS 6,039,894 A * 3/2000 Sanjurjo ............ C09K 11/0827 252/301.5
8,906,724 B2 12/2014 Murphy et al.
(Continued)

FOREIGN PATENT DOCUMENTS

JP H10316409 A 12/1998
JP 2004508215 A 3/2004
(Continued)

OTHER PUBLICATIONS

Non-Final Office Action, United States Patent and Trademark Office, issued to U.S. Appl. No. 18/000,275 on Oct. 28, 2025, 7 pages.
(Continued)

*Primary Examiner* — Matthew E. Hoban
*Assistant Examiner* — Lynne Edmondson
(74) *Attorney, Agent, or Firm* — Hunton Andrews Kurth LLP

(57) ABSTRACT

Provided is a method for producing an inorganic fluoride luminescent material using a non-aqueous solution.
The method for producing an inorganic fluoride luminescent material includes: either preparing a first non-aqueous solution that contains a first ion, a second ion, and a first non-aqueous hydrogen fluoride-containing liquid, and a second non-aqueous solution that contains a third ion and a second non-aqueous hydrogen fluoride-containing liquid, or preparing a third non-aqueous solution that contains a first ion, a second ion, a third ion, and a third non-aqueous hydrogen fluoride-containing liquid; and either mixing the first non-aqueous solution and the second non-aqueous solution with a non-aqueous organic liquid, or mixing the third non-aqueous solution with a non-aqueous organic liquid, to obtain an inorganic fluoride luminescent material
(Continued)

containing a first element M1 and/or ammonium, a second element M2, and a third element M3.

16 Claims, 7 Drawing Sheets

(58) Field of Classification Search
CPC ............ C09K 11/0833; C09K 11/0838; C09K 11/645; C09K 11/665; C09K 11/7704; C09K 11/7705; C09K 11/57
See application file for complete search history.

(56) References Cited

U.S. PATENT DOCUMENTS

| | | | | |
|---|---|---|---|---|
| 8,974,696 | B2 | 3/2015 | Kaneyoshi et al. | |
| 9,564,558 | B2 | 2/2017 | Yoshida et al. | |
| 9,698,314 | B2 | 7/2017 | Murphy et al. | |
| 10,112,835 | B2 | 10/2018 | Yahata et al. | |
| 10,214,688 | B2 | 2/2019 | Yoshida et al. | |
| 2003/0032192 | A1* | 2/2003 | Haubold ............ | C09K 11/7792<br>423/311 |
| 2012/0256125 | A1 | 10/2012 | Kaneyoshi et al. | |
| 2014/0264418 | A1 | 9/2014 | Murphy et al. | |
| 2014/0327026 | A1 | 11/2014 | Murphy et al. | |
| 2015/0035430 | A1 | 2/2015 | Yoshida et al. | |
| 2016/0075557 | A1 | 3/2016 | Yahata et al. | |
| 2017/0088772 | A1 | 3/2017 | Yoshida et al. | |
| 2022/0186115 | A1 | 6/2022 | Takatori et al. | |

FOREIGN PATENT DOCUMENTS

| | | | |
|---|---|---|---|
| JP | 2009155130 | A | 7/2009 |
| JP | 2010209311 | A | 9/2010 |
| JP | 2012224536 | A | 11/2012 |
| JP | 2013030398 | A | 2/2013 |
| JP | 2013159718 | A | 8/2013 |
| JP | 2015013795 | A | 1/2015 |
| JP | 2015044973 | A | 3/2015 |
| JP | 2016517464 | A | 6/2016 |
| JP | 2019183130 | A | 10/2019 |
| WO | 2009119486 | A1 | 10/2009 |

OTHER PUBLICATIONS

USPTO, Notice of Allowance issued in the related U.S. Appl. No. 18/000,275 (12 pages).

* cited by examiner

PRODUCTION METHOD OF INORGANIC FLUORIDE LUMINESCENT MATERIAL

CROSS-REFERENCE TO RELATED APPLICATIONS

This application is a national stage entry of International Application No. PCT/JP2021/019089, filed on May 20, 2021, which claims priority to Japanese Patent Application No. 2020-094474, filed on May 29, 2020, the disclosure of which is hereby incorporated by reference in its entirety.

TECHNICAL FIELD

The present invention relates to a method for producing an inorganic fluoride luminescent material.

BACKGROUND ART

Fluoride crystals have excellent permeability. Inorganic fluoride luminescent materials, in which rare earth metal elements are added to fluoride crystals, are used as fiber lasers, laser media for fiber amplifiers, and fluorescent materials that convert the wavelength of excitation light emitted from a light source. Fluorescent materials are used in light emitting devices for lighting, in-vehicles, and liquid crystal display backlighting, in combination with, for example, light emitting elements that emit light on the short wavelength side of the spectrum corresponding to visible light from ultraviolet light.

Examples of the fiber lasers and the laser media for fiber amplifiers include fluoride crystals such as $LiYF_4$ (hereinafter, also referred to as "YLF"), $LiLuF_4$, $BaY_2F_8$, and $KY_3F_{10}$, added with at least one rare earth metal element selected from the group consisting of Tm, Ho, Pr, Er, and Yb, ZBLAN ($ZrF_4$—$BaF_2$—$LaF_3$—$AlF_3$—NaF) glass fibers containing $ZrF_4$ as a main component, and $AlF_3$-based glass fibers ($AlF_3$—$BaF_2$—$SrF_2$—$CaF_2$—$MgF_2$—$YF_3$) containing $AlF_3$ as a main component.

Examples of the fluorescent materials include fluoride fluorescent materials that emit red light. For example, Patent Literature 1 describes a method for obtaining an inorganic fluoride fluorescent material having a composition represented by $K_2SiF_6:Mn^{4+}$in an aqueous solution containing hydrogen fluoride.

CITATION LIST

Patent Literature

Patent Literature 1: Japanese Unexamined Patent Publication No. 2012-224536

SUMMARY OF THE INVENTION

Problem to be Solved by the Invention

The optical characteristics of the inorganic fluoride luminescent materials are affected by hydroxide ions (Off) or water ($H_2O$) contained in the raw material. As described in, for example, Patent Literature 1, the optical characteristics of an inorganic fluoride fluorescent material produced using an aqueous solution may be affected by moisture (hydroxide ions ($OH^-$) or water) contained in the aqueous solution.

Accordingly, the present invention has an object to provide a method for producing an inorganic fluoride luminescent material using a non-aqueous solution, without using an aqueous solution.

Means for Solving Problem

The present invention includes the following aspect.

An aspect of the present invention relates to a method for producing an inorganic fluoride luminescent material including: either preparing a first non-aqueous solution that contains at least one first ion containing at least one selected from the group consisting of a first element M1 and ammonium, at least one second ion containing a second element M2 other than the first element M1, and a first non-aqueous hydrogen fluoride-containing liquid having a hydrogen fluoride content in a range of 20% by mass or more and 100% by mass or less, and a second non-aqueous solution that contains a third ion containing a third element M3 other than the first element M1 and the second element M2, and a second non-aqueous hydrogen fluoride-containing liquid having a hydrogen fluoride content in a range of 20% by mass or more and 100% by mass or less, or preparing a third non-aqueous solution that contains at least one first ion containing at least one selected from the group consisting of a first element M1 and ammonium, at least one second ion containing a second element M2 other than the first element M1, a third ion containing a third element M3 other than the first element M1 and the second element M2, and a third non-aqueous hydrogen fluoride-containing liquid having a hydrogen fluoride content in a range of 20% by mass or more and 100% by mass or less; and either mixing the first non-aqueous solution and the second non-aqueous solution with a non-aqueous organic liquid having a hydrogen fluoride content of less than 20% by mass, or mixing the third non-aqueous solution with a non-aqueous organic liquid having a hydrogen fluoride content of less than 20% by mass, to obtain an inorganic fluoride luminescent material containing the first element M1 and/or ammonium, the second element M2, and the third element M3.

Effect of the Invention

In accordance with the above-mentioned aspect, a production method for obtaining an inorganic fluoride luminescent material using a non-aqueous solution can be provided without using an aqueous solution.

MODE(S) FOR CARRYING OUT THE INVENTION

Figure 1:
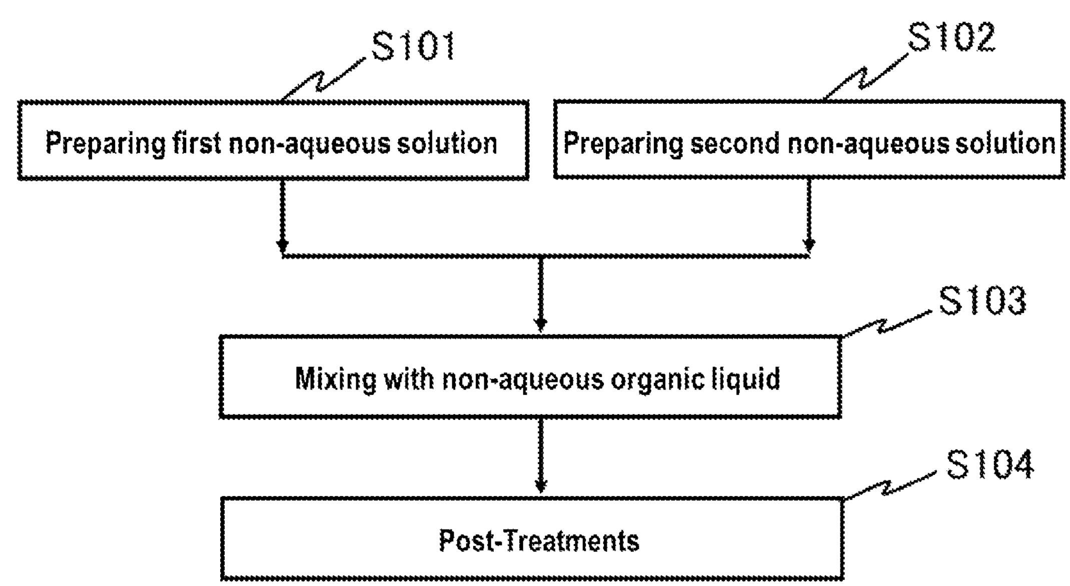
FIG. 1 is a flowchart showing a first example of a method for producing an inorganic fluoride luminescent material.

A method for producing an inorganic fluoride luminescent material according to the present invention will be hereunder described based on embodiments. The embodiments described below are exemplifications for embodying the technical idea of the present invention, and the present invention is not limited to the following method for producing an inorganic fluoride luminescent material. The relationships between color names and chromaticity coordinates, and the relationships between wavelength ranges of light and color names of monochromic light are in accordance with Japanese Industrial Standard (JIS) Z8110. In the present specification, the light emission is not limited to light emission having a wavelength in a range of visible light, but also includes light emission having a wavelength in a range outside the wavelength range of visible light.

Method for Producing Inorganic Fluoride Luminescent Material

The method for producing an inorganic fluoride luminescent material includes: preparing a first non-aqueous solution that contains at least one first ion containing at least one selected from the group consisting of a first element M1 and ammonium, at least one second ion containing a second element M2 other than the first element M1, and a first non-aqueous hydrogen fluoride-containing liquid having a hydrogen fluoride content in a range of 20% by mass or more and 100% by mass or less; preparing a second non-aqueous solution that contains a third ion containing a third element M3 other than the first element M1 and the second element M2, and a second non-aqueous hydrogen fluoride-containing liquid having a hydrogen fluoride content in a range of 20% by mass or more and 100% by mass or less; and mixing the first non-aqueous solution and the second non-aqueous solution with a non-aqueous organic liquid having a hydrogen fluoride content of less than 20% by mass, to obtain an inorganic fluoride luminescent material containing the first element M1 and/or ammonium, the second element M2, and the third element M3.

The method for producing an inorganic fluoride luminescent material also includes: preparing a third non-aqueous solution that contains at least one first ion containing at least one selected from the group consisting of a first element M1 and ammonium, at least one second ion containing a second element M2 other than the first element M1, a third ion containing a third element M3 other than the first element M1 and the second element M2, and a second non-aqueous hydrogen fluoride-containing liquid having a hydrogen fluoride content in a range of 20% by mass or more and 100% by mass or less; and mixing the third non-aqueous solution with a non-aqueous organic liquid having a hydrogen fluoride content of less than 20% by mass, to obtain an inorganic fluoride luminescent material containing the first element M1 and/or ammonium, the second element M2, and the third element M3.

With the method for producing an inorganic fluoride luminescent material, an inorganic fluoride luminescent material, of which the optical characteristics are not affected by moisture in a production process, by using a non-aqueous solution can be obtained without using an aqueous solution.

FIG. 1 is a flowchart showing a first example of the method for producing an inorganic fluoride luminescent material. The method for producing an inorganic fluoride luminescent material includes preparing a first non-aqueous solution (S101), preparing a second non-aqueous solution (S102), and mixing the first non-aqueous solution and the second non-aqueous solution with a non-aqueous organic liquid having a hydrogen fluoride content of less than 20% by mass, to obtain an inorganic fluoride luminescent material containing a first element M1 and/or ammonium, a second element M2, and a third element M3 (S103). The method for producing an inorganic fluoride luminescent material may include post-treatments (S104), such as a separation treatment, a washing treatment, and a drying treatment, of the obtained inorganic fluoride luminescent material.

Figure 2:
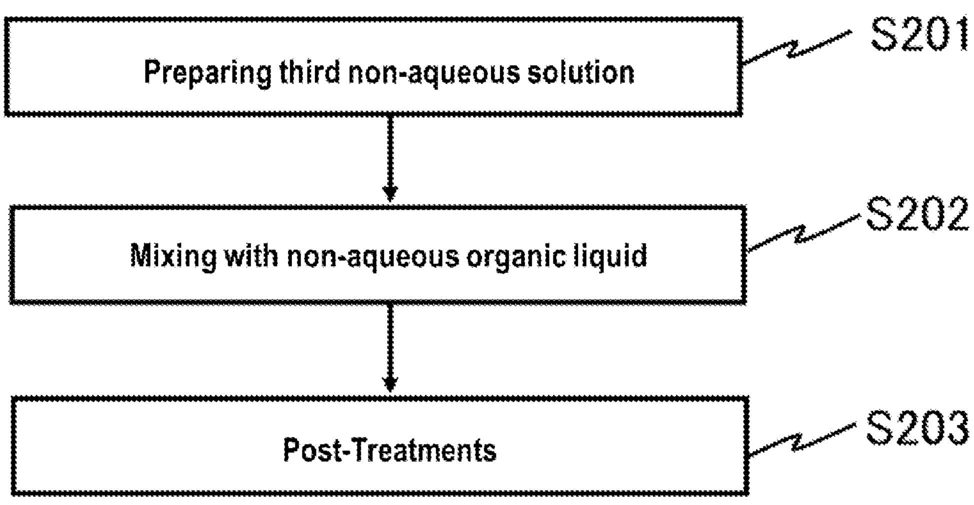
FIG. 2 is a flowchart showing a second example of a method for producing an inorganic fluoride luminescent material.

FIG. 2 is a flowchart showing a second example of the method for producing an inorganic fluoride luminescent material. The method for producing an inorganic fluoride luminescent material includes preparing a third non-aqueous solution (S201), and mixing the third non-aqueous solution with a non-aqueous organic liquid having a hydrogen fluoride content of less than 20% by mass, to obtain an inorganic fluoride luminescent material containing a first element M1 and/or ammonium, a second element M2, and a third element M3 (S202). The method for producing an inorganic fluoride luminescent material may include post-treatments (S203), such as a separation treatment, a washing treatment, and a drying treatment, of the obtained inorganic fluoride luminescent material.

Preparing First Non-Aqueous Solution

The first non-aqueous solution contains at least one first ion containing at least one selected from the group consisting of a first element M1 and ammonium, at least one second ion containing a second element M2 other than the first element M1, and a first non-aqueous hydrogen fluoride-containing liquid having a hydrogen fluoride content in a range of 20% by mass or more and 100% by mass or less. The compound containing the first element M1 or ammonium and the compound containing the second element M2 are dissolved in the first non-aqueous hydrogen fluoride-containing liquid to be the first ion and the second ion, which form the first non-aqueous solution, along with the first non-aqueous hydrogen fluoride-containing liquid.

First Element M1

Examples of the first element M1 include at least one element selected from the group consisting of alkali metal elements and alkaline earth metal elements. Specific examples of the first element M1 include at least one element selected from the group consisting of Li, Na, K, Rb, Cs, Fr, Be, Mg, Ca, Sr, Ba, and Ra. The first element M1 may include one element selected from the group consisting of alkali metal elements and alkaline earth metal elements, and may include two or more elements of these. For example, in the case where the target inorganic fluoride luminescent material is $K_2SiF_6$ containing the third element M3 that contributes to light emission, K can be selected as the first element M1. In the case where the target inorganic fluoride luminescent material is $LiYF_4$ containing the third element M3 that contributes to light emission, Li can be selected as the first element M1. For example, in the case where the target inorganic fluoride luminescent material is a ZBLAN ($ZrF_4$—$BaF_2$—$LaF_3$—$AlF_3$—NaF) glass fiber, Ba and Na can be selected as the first element M1. In the case where the target inorganic fluoride luminescent material is an $AlF_3$-based glass fiber ($AlF_3$—$BaF_2$—$SrF_2$—$CaF_2$—$MgF_2$—$YF_3$), Ba, Sr, Ca, and Mg can be selected as the first element M1.

First Ion

Examples of the first ion include a cation composed of the first element M1 or ammonium. Specific examples of the first ion include at least one cation selected from the group consisting of $Li^+$, $Na^+$, $K^+$, $Rb^+$, $Cs^+$, $Fr^+$, $B^{2+}$, $MG^{2+}$, $ca^{2+}$, $Sr^{2+}$, $Ba^{2+}$, $Ra^{2+}$, and $NH_4^+$. The first ion may include at least one cation selected from the first element M1 and/or ammonium, and may include two or more cations of these. In the case where the target inorganic fluoride luminescent material is an inorganic fluoride fluorescent material having a composition represented by the formula (I) described below, the first ion preferably includes at least one cation selected from the group consisting of alkali metal elements and ammonium, and preferably includes at least one cation selected from the group consisting of $Li^+$, $Na^+$, $K^+$, $Rb^+$, $Cs^+$, and $NH_4^+$. Examples of the raw material of the first element M1 or ammonium to be the first ion include compounds containing the first element M1 or ammonium, such as fluorides, fluorohydrides, chlorides, bromides, iodides, acetates, and carbonates containing alkali metal elements, alkaline earth metal elements, or ammonium ions. In the case where the raw material of the first element M1 or ammonium is a fluoride containing the first element M1 or ammonium, the first ion may contain the second element M2 in addition to the first element M1 and fluorine.

The lower limit of the concentration of the first ion is preferably 1% by mass or more, more preferably 2% by mass or more, and even more preferably 3% by mass or more. In addition, the upper limit of the concentration of the first ion is preferably 20% by mass or less, more preferably 15% by mass or less, and even more preferably 10% by mass or less. When the concentration of the first ion falls within the range of 1% by mass or more and 20% by mass or less, the yield of an inorganic fluoride luminescent material to be obtained tends to be improved. The first ion may include one ion selected from the group consisting of the first element M1 and ammonium, and may include two or more ions selected from the group consisting of the first element M1 and ammonium. When containing two or more first ions, the concentration of the first ion is the total value of the concentrations of two or more first ions.

Second Element M2

The second element M2 is an element other than the first element M1, and examples thereof include at least one element selected from the group consisting of non-luminescent transition metal elements, Group 12 elements, Group 13 elements, Group 14 elements, and Group 15 elements. In the present specification, the non-luminescent transition metal elements mean transition metal elements that do not contribute to light emission in the inorganic fluoride luminescent material. The non-luminescent transition metal elements in the present specification mainly constitute a host crystal of the inorganic fluoride luminescent material, and do not contribute to light emission. Examples of the non-luminescent transition metal elements include at least one element selected from the group consisting of Sc, Ti, Y, Zr, Nb, La, Gd, Hf, and Ta. Examples of the Group 12 elements include at least one element selected from the group consisting of Zn, Cd, and Hg. Examples of the Group 13 elements include at least one element selected from the group consisting of Al, Ga, In, and Tl. Examples of the Group 14 elements include at least one element selected from the group consisting of Si, Ge, Sn, and Pb. Examples of the Group 15 elements include at least one element selected from the group consisting of As, Sb, and Bi. The second element M2 may include one element selected from the group consisting of non-luminescent transition metal elements, Group 12 elements, Group 13 elements, Group 14 elements, and Group 15 elements, and may include two or more elements of these. The second element M2 preferably includes at least one selected from the group consisting of Sc, Ti, Y, Zr, Nb, La, Gd, Hf, Ta, Zn, Cd, Hg, Al, Ga, In, Tl, Si, Ge, Sn, Pb, As, Sb, and Bi. In the case where the target inorganic fluoride luminescent material is $K_2SiF_6$ containing the third element M3 that contributes to light emission, Si can be selected as the second element M2. In the case where the target inorganic fluoride luminescent material is $LiYF_4$ containing the third element M3 that contributes to light emission, Y can be selected as the second element M2. In the case where the target inorganic fluoride luminescent material is a ZBLAN ($ZrF_4$—$BaF_2$—$LaF_3$—$AlF_3$—NaF) glass fiber, Zr, La, and Al can be selected as the second element M2. In the case where the target inorganic fluoride luminescent material is an $AlF_3$-based glass fiber ($AlF_3$—$BaF_2$—$SrF_2$—$CaF_2$—$MgF_2$—$YF_3$), Al and Y can be selected as the second element M2. In the present specification, the "non-luminescent" means not only not emitting light by light having a wavelength in a range of visible light, but also not emitting light by light having a wavelength in a range outside the wavelength of visible light.

Second Ion

Examples of the second ion include a cation composed of the second element M2 and a first complex ion containing the second element and fluorine. Specific examples of the cation composed of the second element M2 include at least one cation selected from the group consisting of $Sc^{3+}$, $Ti^{3+}$, $Ti^{4+}$, $Y^{3+}$, $Zr^{4+}$, $Nb^{4+}$, $Nb^{5+}$, $La^{3+}$, $Gd^{3+}$, $Hf^{4+}$, $Ta^{4+}$, $Ta^{5+}$, $Zn^{2+}$, $Cd^{2+}$, $Hg^+$, $Hg^{2+}$, $Al^{3+}$, $Ga^{3+}$, $In^{3+}$, $Tl^+$, $Tl^{3+}$, $Si^{4+}$, $Ge^{2+}$, $Ge^{4+}$, $Sn^{2+}$, $Sn^{4+}$, $Pb^{2+}$, $Pb^{4+}$, $As^{3+}$, $As^{5+}$, $Sb^{3+}$, $Sb^{5+}$, and $Bi^{3+}$. In the case where the target inorganic fluoride luminescent material is an inorganic fluoride fluorescent material having a composition represented by the formula (I) described below, the second ion preferably includes an ion composed of at least one element selected from the group consisting of non-luminescent transition metal elements, Group 13 elements, Group 14 elements, and Group 15 elements. Examples of the raw material of the second element M2 to be the second ion include compounds containing the second element M2, such as fluorides, fluorohydrides, chlorides, bromides, iodides, acetates, carbonates, and sulfates containing at least one second element M2 selected from the group consisting of non-luminescent transition metal elements, Group 12 elements, Group 13 elements, Group 14 elements, and Group 15 elements. In the case where the raw material of the second element M2 is a fluoride containing the second element M2, the second ion may contain the first element M1 or ammonium in addition to the second element M2 and fluorine.

The second ion is preferably a first complex ion containing the second element M2 and fluorine. The first complex ion is preferably a first complex ion containing at least one second element M2 selected from the group consisting of non-luminescent transition metal elements, Group 13 elements, Group 14 elements, and Group 15 elements. The first complex ion is preferably a complex ion containing at least one second element M2 selected from the group consisting of Si, Ge, Sn, Ti, Zr, Al, Ga, In, Sc, Hf, Y, La, Nb, Ta, Bi, and Gd. When the first ion is a first complex ion, it is more preferably a first fluoride complex ion containing the second element M2 and fluorine. The first fluoride complex ion containing the second element M2 is preferably a first fluoride complex anion with two or more fluorines bonded to the second element M2 as the central atom. When the second ion is a first fluoride complex ion containing the second element M2 and fluorine, examples of the first fluoride complex ion include $YF_4^-$, $SiF_6^{2-}$, and $AlF_6^{3-}$. Examples of the raw material to be the first fluoride complex ion include tetrafluoroyttrium salt, hexafluorosilicic acid or hexafluorosilicate, hexafluorogermanium salt, hexafluorotinate, hexafluorotitaniumate, hexafluorozirconate, hexafluoroaluminate, and hexafluorogallate.

The lower limit of the concentration of the second ion is preferably 0.50% by mass or more, more preferably 0.75% by mass or more, and even more preferably 1% by mass or more. In addition, the upper limit of the concentration of the second ion is preferably 20% by mass or less, more preferably 15% by mass or less, and even more preferably 10% by mass or less. When the concentration of the second ion composed of the second element falls within the range of 0.50% by mass or more and 20% by mass or less, the yield of an inorganic fluoride luminescent material to be obtained tends to be improved. The second ion may include one ion composed of one second element M2, and may include two or more ions composed of two or more second elements M2. When containing two or more second ions, the concentration of the second ion is the total value of the concentrations of two or more second ions.

The lower limit of the concentration of the first complex ion containing the second element M2 is preferably 2% by mass or more, more preferably 4% by mass or more, and even more preferably 6% by mass or more. In addition, the upper limit of the concentration of the first complex ion in the first non-aqueous solution is preferably 45% by mass or less, more preferably 40% by mass or less, and even more preferably 35% by mass or less. When the concentration of the first complex ion containing the second element M2 in the first non-aqueous solution falls within the range of 2% by mass or more and 45% by mass or less, the yield of an inorganic fluoride luminescent material to be obtained tends to be improved.

The first non-aqueous hydrogen fluoride-containing liquid contained in the first non-aqueous solution can be the same as the second non-aqueous hydrogen fluoride-containing liquid or the third non-aqueous hydrogen fluoride-containing liquid described below, and thus they will be described collectively. The first non-aqueous hydrogen fluoride-containing liquid, the second non-aqueous hydrogen fluoride-containing liquid, or the third non-aqueous hydrogen fluoride-containing liquid (hereinafter, also referred to as "non-aqueous hydrogen fluoride-containing liquid") has a hydrogen fluoride content in a range of 20% by mass or more and 100% by mass or less. The first non-aqueous hydrogen fluoride-containing liquid may contain hydrogen fluoride in an amount capable of dissolving the compound containing the first element M1 or ammonium and the compound containing the second element M2 to form the first ion and the second ion. The second non-aqueous hydrogen fluoride-containing liquid may contain hydrogen fluoride in an amount capable of dissolving the compound containing the third element M3 described below to form the third ion. The third non-aqueous hydrogen fluoride-containing liquid may contain hydrogen fluoride in an amount capable of dissolving the compound containing the first element M1 or ammonium, the compound containing the second element M2, and the compound containing the third element M3 to form the first ion, the second ion, and the third ion. The content of hydrogen fluoride in the non-aqueous hydrogen fluoride-containing liquid, in which the compound containing the first element M1 or ammonium, the compound containing the second element M2, and the compound containing the third element M3 can be dissolved to form the first ion, the second ion, and the third ion, is in a range of 20% by mass or more and 100% by mass or less. The non-aqueous hydrogen fluoride-containing liquid may be 100% by mass of liquid hydrogen fluoride under standard conditions (25° C., 1 atm). The content of hydrogen fluoride in the non-aqueous hydrogen fluoride-containing liquid may be in a range of 20% by mass or more and 30% by mass or less, and may be in a range of 60% by mass or more and 80% by mass or less.

The non-aqueous hydrogen fluoride-containing liquid may contain a compound that is a liquid under standard conditions (25° C., 1 atm) and has a boiling point of 120° C. or higher, in addition to hydrogen fluoride. The non-aqueous hydrogen fluoride-containing liquid may contain at least one selected from the group consisting of nitrogen-containing heterocyclic compounds, amines, ureas, amides, carbamic acids, trialkylphosphines, ethers, esters, alcohols, and quaternary ammonium salts. The compound contained in the non-aqueous hydrogen fluoride-containing liquid may be at least one selected from the group consisting of nitrogen-containing heterocyclic compounds, amines, ureas, amides, carbamic acids, trialkylphosphines, ethers, esters, alcohols, and quaternary ammonium salts. Examples of commercially available non-aqueous hydrogen fluoride-containing liquids include an OLAH reagent that is a pyridine-HF complex containing 70% by mass of hydrogen fluoride and pyridine. Examples of the non-aqueous hydrogen fluoride-containing liquid include a triethylamine-HF complex containing 28% by mass of hydrogen fluoride and triethylamine. In addition, examples of the non-aqueous hydrogen fluoride-containing liquid include a urea-HF complex containing 65% by mass to 75% by mass of hydrogen fluoride and urea, and a DMPU-HF complex containing 65% by mass of hydrogen fluoride and N,N'-dimethylpropylene urea. The components (for example, pyridine) contained in the non-aqueous hydrogen fluoride-containing liquid can be detected by nuclear magnetic resonance (proton NMR) by dissolving the resulting inorganic fluoride luminescent material in a deuterated solvent.

Examples of the nitrogen-containing heterocyclic compounds include alicyclic compounds having a ring selected from pyrrolidine and piperidine; and heterocyclic aromatic compounds having a ring selected from pyrrole, pyrazole, imidazole, isoxazole, thiazole, thiadiazol, pyridine, pyridazine, pyrimidine, pyrazine, triazine, indole, benzimidazole, benzoxazole, benzothiazole, benzotriazole, purine, quinoline, isoquinoline, quinoxaline, quinazoline, acridine, and phenanthroline. The nitrogen-containing heterocyclic compounds may contain fluorine, chlorine, and bromine in the compounds.

Examples of the compound containing imidazole as the nitrogen-containing heterocyclic compound, and fluorine include an imidazolium salt represented by the following formula (1).

(1)

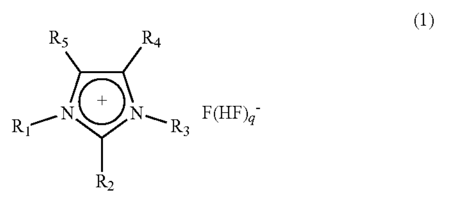

In the formula (1), $R_1$ and $R_3$ each independently represent an alkyl group having 1 to 4 carbon atoms; and $R_2$, $R_4$, and $R_5$ each independently represent a hydrogen atom or an alkyl group having 1 to 4 carbon atoms. Apart or all of $R_1$ to $R_5$ may be mutually bonded to form a ring. Examples of the alkyl group having 1 to 4 carbon atoms include a methyl group, an ethyl group, an n-propyl group, an iso-propyl group, and an n-butyl group. $R_2$, $R_4$, and $R_5$ may include a hydrogen atom, a methyl group, or an ethyl group, or may include a hydrogen atom. In the formula (1), q represents a numerical value from 1 to 4, and may not necessarily be an integer. The numerical value of q can be calculated from the elemental analysis value of the compound.

Specific examples of the compound represented by formula (1) include 1,3-dimethylimidazolium salt, 1,3,4-trimethylimidazolium salt, and 1-ethyl-3-methylimidazolium salt; and 1-ethyl-3-methylimidazolium salt is a salt that melts at room temperature. In the formula (1), a part or all of $R_1$ to $R_5$ may be mutually bonded to form a ring. Specific examples thereof include 1,3-dimethylbenzimidazolium salt and 1-ethyl-3-methylbenzimidazolium salt.

Among the nitrogen-containing heterocyclic compounds containing fluorine, chlorine, or bromine, examples of the nitrogen-containing heterocyclic compound mainly containing chlorine or bromine include 2-trichloromethylpyrrole, 2-tribromomethylpyrrole, 4-chloro-3-trichloromethylpyrazole, 4-chloro-3,5-bis [trichloromethyl] pyrazole, 4-chloro-3-tribromomethylpyrazole, 4-chloro-3,5-bis [tribromomethyl] pyrazole, 1-methyl-3-trichloromethylpyrazole-4-carboxylate ethyl, 1,2-bis [trichloromethyl] imidazole, 1,3-bis [trichloromethyl]] imidazole, 1,5-bis [trichloromethyl] imidazole, 2,5-bis [trichloromethyl] imidazole, 4,5-bis [trichloromethyl] imidazole, 1,2,5-tris [trichloromethyl] imidazole, 2,3,4-tris [trichloromethyl] imidazole, 1,2-bis [tribromomethyl] imidazole, 1,3-bis [tribromomethyl] imidazole, 1,5-bis [tribromomethyl] imidazole, 2,5-bis [tribromomethyl] imidazole, 4,5-bis [tribromomethyl] imidazole, 1,2,5-tris [tribromomethyl] imidazole, 2,3,4-tris [tribromomethyl] imidazole, 2-trichloromethylpyridine, 3-trichloromethylpyridine, 4-trichloromethylpyridine, 2,3-2,5-bis [trichloromethyl] pyridine, 2,6-bis [trichloromethyl] pyridine, 3,5-bis [trichloromethyl] pyridine, 2-tribromomethylpyridine, 3-tribromomethylpyridine, 4-tribromomethylpyridine, 2,3-2,5-bis [tribromomethyl] pyridine, 2,6-bis [tribromomethyl] pyridine, 3,5-bis [tribromomethyl] pyridine, 3-trichloromethylpyridazine, 3-tribromomethylpyridazine, 4-trichloromethylpyridazine, 4-tribromomethylpyridazine, 2,4-bis [trichloromethyl] pyrimidine, 2,6-bis [trichloromethyl] pyrimidine, 2,4-bis [tribromomethyl] pyrimidine, 2,6-bis [tribromomethyl] pyrimidine, 2,4-dichloro-5-trichloromethylpyrimidine, 2-trichloromethylpyrazine, 2-tribromomethylpyrazine, 1,3,5-trisbis [trichloromethyl] triazine, 1,3,5-trisbis [tribromomethyl] triazine, 4-trichloromethylindole, 5-trichloromethylindole, 4-tribromomethylindole, 5-tribromomethylindole, 2-trichloromethylbenzimidazole, 2-tribromomethylbenzimidazole, 5-trichloromethyl-1H-benzotriazole, 5-tribromomethyl-1H-benzotriazole, 6-trichloromethylpurine, 6-tribromomethylpurine, 3-trichloromethylquinoline, 4-trichloromethylquinoline, 3-tribromomethylquinoline, 4-tribromomethylquinoline, 3-trichloromethylisoquinoline, 3-tribromomethylisoquinoline, 4-trichloromethyltinorin, 4-tribromomethyltinorin, 2-trichloromethylquinoxaline, 2-tribromomethylquinoxaline, 5-trichloromethylquinoxaline, 5-tribromomethylquinoxaline, 9-trichloromethylacridine, 9-tribromomethylacridine, 4-trichloromethyl-1,10-phenanthroline, 4-tribromomethyl-1,10-phenanthroline, 5-trichloromethyl-1,10-phenanthroline, and 5-tribromomethyl-1,10-phenanthroline.

Among the oxygen and nitrogen-containing heterocyclic compounds containing fluorine, chlorine, or bromine, examples of the oxygen and nitrogen-containing heterocyclic compound mainly containing chlorine or bromine include 3,5-bis [trichloromethyl] isoxazole, 3,5-bis [tribromomethyl] isoxazole, 2-trichloromethylbenzoxazole, and 2-tribromomethylbenzoxazole.

Among the sulfur and nitrogen-containing heterocyclic compounds containing fluorine, chlorine, or bromine, examples of the sulfur and nitrogen-containing heterocyclic compound mainly containing chlorine or bromine include 4,5-bis [trichloromethyl] thiazole, 4,5-bis [tribromomethyl] thiazole, 5-trichloromethyl-thiadiazole, 5-tribromomethyl-thiadiazole, 2-trichloromethylbenzothiazole, and 2-tribromomethylbenzothiazole.

Examples of the amines include methylamine, ethylamine, dimethylamine, diethylamine, trimethylamine, triethylamine, n-propylamine, isopropylamine, n-butylamine, dibutylamine, tributylamine, diethylenetriamine, monoethanolamine, triethanolamine, 1,2-propylenediamine, monoisopropanolamine, diisopropanolamine, triisopropanolamine, o-toluidine, p-nitrotoluene, N-(2-aminoethyl) ethanolamine, aniline, piperazine, and triethylenetetramine.

Examples of the ureas include urea, 1,1,3,3-tetramethylurea, 1,3-dimethyl-2-imidazolidinone, 1,3-diethyl-2-imidazolidinone, 1,3-di (n-propyl)-2-imidazolidinone, 1,3-di(n-butyl)-2-imidazolidinone, 1,3-dimethyl-3,4,5,6-tetrahydro-2(1H)-pyrimidinone, N,N'-dimethylpropylurea, N,N'-diethylpropylurea, N,N'-di(n-propyl) propylurea, and N,N'-di(n-butyl) propylurea.

Examples of the amides include N,N'-dimethylformamide, N,N'-diethylformamide, N,N'-dimethylacetamide, and 1-methyl-2-pyrrolidone.

Examples of the carbamic acids include carbamic acid and ethyl carbamate.

Examples of the trialkylphosphines include hexamethylphosphoramide.

Examples of the ethers include n-butyl ether, n-hexyl ether, anisole, phenetole, butylphenyl ether, amylphenyl ether, methoxytoluene, benzylmethyl ether, diphenyl ether, dibenzyl ether, 1,2-diethoxyethane, 1,2-dibutoxyethane, diethylene glycol dimethyl ether, diethylene glycol diethyl ether, and diethylene glycol dibutyl ether.

Examples of the esters include n-butyl acetate, n-pentyl acetate, isopentyl acetate, cyclohexyl acetate, benzyl acetate, butyl propionate, isopentyl propionate, methyl benzoate, dimethyl phthalate, and γ-butyrolactone.

Examples of the alcohols include alcohols having a hydrocarbon group having 4 or more carbon atoms, such as 1-butanol, 2-methyl-1-propanol, 2-butanol, 2-methyl-2-propanol, butanol, 1-pentanol, 2-pentanol, 1-hexanol, 2-hexanol, 2-methyl-2-pentanol, 1-heptanol, 2-heptanol, 1-octanol, 1-nonanol, 1-decanol, 1-undecanol, and 1-dodecanol.

Examples of the quaternary ammonium salts include a quaternary ammonium salt represented by the following formula (2).

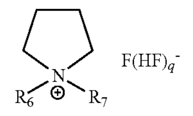

(2)

In the formula (2), $R_6$ represents an alkyl group having 1 to 4 carbon atoms; $R_7$ represents a methoxymethyl group, a methoxyethyl group, and an ethoxymethyl group; and q represents a numerical value from 1 to 4.

The quaternary ammonium salt represented by the formula (2) is composed of a quaternary ammonium cation and a fluorohydrogenate anion. Examples of $R_6$ in the quaternary ammonium cation include a linear or branched alkyl group having 1 to 4 carbon atoms. Specific examples thereof include a methyl group, an ethyl group, an n-propyl group, an iso-propyl group, an n-butyl group, an iso-butyl group, and a tert-butyl group. Examples of $R_7$ in the quaternary ammonium cation include a methoxymethyl group, a methoxyethyl group, and an ethoxymethyl group. Examples of the fluorohydrogenate anion include a fluorohydrogenate anion represented by $F(HF)_q^-$, wherein q represents a numerical value from 1 to 4. Here, q may not necessarily be an integer; and is preferably a numerical value of 1.5 or more and 3 or less, and more preferably 2 or more and 2.5 or less.

Specific examples thereof include

N-methoxymethyl-N-methylpyrrolidinium fluorohydrogenate,
N-methoxymethyl-N-ethylpyrrolidinium fluorohydrogenate,
N-methoxymethyl-N-n-propylpyrrolidinium fluorohydrogenate,
N-methoxymethyl-N-iso-propylpyrrolidinium fluorohydrogenate,
N-methoxymethyl-N-n-butylpyrrolidinium fluorohydrogenate,
N-methoxymethyl-N-iso-butylpyrrolidinium fluorohydrogenate,
N-methoxymethyl-N-tert-butylpyrrolidinium fluorohydrogenate,
N-methoxyethyl-N-methylpyrrolidinium fluorohydrogenate,
N-methoxyethyl-N-ethylpyrrolidinium fluorohydrogenate,
N-methoxyethyl-N-n-propylpyrrolidinium fluorohydrogenate,
N-methoxyethyl-N-iso-propylpyrrolidinium fluorohydrogenate,
N-methoxyethyl-N-n-butylpyrrolidinium fluorohydrogenate,
N-methoxyethyl-N-iso-butylpyrrolidinium fluorohydrogenate,
N-methoxyethyl-N-tert-butylpyrrolidinium fluorohydrogenate,
N-ethoxymethyl-N-methylpyrrolidinium fluorohydrogenate,
N-ethoxymethyl-N-ethylpyrrolidinium fluorohydrogenate,
N-ethoxymethyl-N-n-propylpyrrolidinium fluorohydrogenate,
N-ethoxymethyl-N-iso-propylpyrrolidinium fluorohydrogenate,
N-ethoxymethyl-N-n-butylpyrrolidinium fluorohydrogenate,
N-ethoxymethyl-N-iso-butylpyrrolidinium fluorohydrogenate, and
N-ethoxymethyl-N-tert-butylpyrrolidinium fluorohydrogenate.

Preparing Second Non-Aqueous Solution

The second non-aqueous solution contains a third ion containing a third element M3 other than the first element M1 and the second element M2, and a second non-aqueous hydrogen fluoride-containing liquid having a hydrogen fluoride content in a range of 20% by mass or more and 100% by mass or less. The second non-aqueous solution may contain the first element M1 or the first ion containing the first element M1 as long as the third ion containing the third element M3 is contained. The lower limit of the concentration of the third ion in the second non-aqueous solution is preferably 1% by mass or more, more preferably 2% by mass or more, and even more preferably 3% by mass or more. In addition, the upper limit of the concentration of the third ion in the second non-aqueous solution is preferably 20% by mass or less, more preferably 15% by mass or less, and even more preferably 10% by mass or less. When the concentration of the third ion in the second non-aqueous solution falls within the range of 1% by mass or more and 20% by mass or less, the yield of an inorganic fluoride luminescent material to be obtained tends to be improved. The compound containing the third element M3 is dissolved in the second non-aqueous hydrogen fluoride-containing liquid to be the third ion, which form the second non-aqueous solution, along with the second non-aqueous hydrogen fluoride-containing liquid.

Third Element M3

The third element M3 is preferably at least one element selected from luminescent transition metal elements. In the present specification, the luminescent transition metal elements mean transition metal elements that are added to a host crystal structure of the inorganic fluoride luminescent material and contribute to light emission. For example, in the case of fluorescent materials, activating elements added to a host crystal excite electrons by absorbing the energy of electromagnetic waves such as X-rays, ultraviolet rays, and visible light, and release the energy when the electrons return to the ground state, thereby contributing to light emission.

Examples of the luminescent transition metal elements in the third element M3 include at least one third element M3 selected from the group consisting of Mn, Ce, Pr, Nd, Pm, Sm, Eu, Tb, Dy, Ho, Er, Tm, Yb, and Lu. The third element M3 may include one element selected from the luminescent transition metal elements, and may include two or more elements of these. For example, in the case where the target inorganic fluoride luminescent material is an inorganic fluoride fluorescent material having a composition represented by the formula (I) described below, the third element M3 is an activating element and Mn can be selected. For example, in the case where the target inorganic fluoride luminescent material is $LiYF_4$, Pr can be selected as the third element M3 to be added. For example, in the case where the target inorganic fluoride luminescent material is a ZBLAN ($ZrF_4$—$BaF_2$—$LaF_3$—$AlF_3$—NaF) glass fiber or an $AlF_3$-based glass fiber ($AlF_3$—$BaF_2$—$SrF_2$—$CaF_2$—$MgF_2$—$YF_3$), at least one element selected from the group consisting of Pr, Nd, Ho, Er, Dy, Tm, and Yb can be selected as the third element M3 to be added.

Third Ion

Examples of the third ion include a cation composed of the third element M3 and a second complex ion containing the third element M3. Specific examples of the cation composed of the third element M3 include $Mn^{2+}$, $Mn^{4+}$, $Mn^{5+}$, $Mn^{6+}$, $Mn^{7+}$, $Ce^{3+}$, $Ce^{4+}$, $Pr^{3+}$, $Pr^{4+}$, $Nd^{2+}$, $Nd^{3+}$, $Pm^{3+}$, $Sm^{2+}$, $Eu^{2+}$, $Eu^{3+}$, $Tb^{3+}$, $Tb^{4+}$, $Dy^{2+}$, $Dy^{3+}$, $Ho^{3+}$, $Er^{3+}$, $Tm^{2+}$, $Tm^{3+}$, $yb^{2+}$, $yb^{3+}$, and $Lu^{3+}$. Examples of the raw material of the third element M3 to be the third ion include compounds containing the third element M3, such as fluorides, fluorohydrides, chlorides, bromides, iodides, acetates, carbonates, and sulfates containing at least one third element M3 selected from the group consisting of luminescent transition metal elements. In the case where the raw material of the third element M3 is a fluoride containing the third element M3, the third ion may contain the first element M1 or ammonium in addition to the third element M3 and fluorine.

The third ion is preferably a second complex ion containing at least one third element M3 selected from the group consisting of luminescent transition metal elements and fluorine, and more preferably a second fluoride complex ion containing the third element M3. In the case where the target inorganic fluoride luminescent material is an inorganic fluoride fluorescent material having a composition represented by the formula (I) described below, the second complex ion is preferably a complex ion containing Mn, and more preferably a second fluoride complex ion containing Mn ($MnF_6^{2-}$). Examples of the raw material to be the second fluoride complex ion include hexafluoromanganic acids and hexafluoromanganates.

The lower limit of the concentration of the third ion is preferably 1% by mass or more, more preferably 1.5% by mass or more, and even more preferably 2% by mass or more. In addition, the upper limit of the concentration of the third ion is preferably 30% by mass or less, more preferably 20% by mass or less, and even more preferably 15% by mass or less. When the concentration of the third ion composed of the third element falls within the range of 1% by mass or more and 30% by mass or less, the yield of an inorganic fluoride luminescent material to be obtained tends to be improved. The third ion may include one ion composed of one third element M3, and may include two or more ions composed of two or more third elements M3. When containing two or more third ions, the concentration of the third ion is the total value of the concentrations of two or more third ions.

The lower limit of the concentration of the second complex ion containing the third element M3 is usually 2% by mass or more, preferably 4% by mass or more, and more preferably 6% by mass or more. In addition, the upper limit of the concentration of the second complex ion in the second non-aqueous solution is usually 50% by mass or less, preferably 45% by mass or less, and more preferably 40% by mass or less. When the concentration of the second complex ion containing the third element is 36% by mass or more, the yield of an inorganic fluoride luminescent material to be obtained tends to be improved.

Preparing Third Non-Aqueous Solution

The third non-aqueous solution contains at least one first ion containing at least one selected from the group consisting of a first element M1 and ammonium, at least one second ion containing a second element M2 other than the first element M1, a third ion containing a third element M3 other than the first element M1 and the second element M2, and a third non-aqueous hydrogen fluoride-containing liquid having a hydrogen fluoride content in a range of 20% by mass or more and 100% by mass or less.

The first element M1 and ammonium, the first ion, the second element M2, the second ion, the third element M3, and the third ion are the same as those contained in the first non-aqueous solution or the second non-aqueous solution described above. The concentrations of the first ion, the second ion, and the third ion in the third non-aqueous solution can be in the same range as described above. The third non-aqueous hydrogen fluoride-containing liquid can be the same as the first non-aqueous hydrogen fluoride-containing liquid or the second non-aqueous hydrogen fluoride-containing liquid. The second ion may be a first complex ion containing the second element M2 and fluorine, and is preferably a first fluoride complex ion containing the second element M2. The concentration of the first complex ion can be in the same range as the concentration contained in the first non-aqueous solution described above. The third ion may be a second complex ion containing the third element M3 and fluorine, and is preferably a second fluoride complex ion containing the third element M3. The concentration of the second complex ion can be in the same range as the concentration contained in the second non-aqueous solution described above. The compound containing the first element M1 or ammonium, the compound containing the second element M2, and the compound containing the third element M3 are dissolved in the third non-aqueous hydrogen fluoride-containing liquid to be the first ion, the second ion, and the third ion, which form the third non-aqueous solution, along with the third non-aqueous hydrogen fluoride-containing liquid.

In the first non-aqueous solution, the second non-aqueous solution, or the third non-aqueous solution, the first ion may be at least one cation selected from the group consisting of at least one first element M1 selected from the group consisting of alkali metal elements, and ammonium; the second ion may be a first complex ion containing at least one second element M2 selected from the group consisting of non-luminescent transition metal elements, Group 13 elements, Group 14 elements, and Group 15 elements, and fluorine; and the third ion may be a second complex ion containing at least one third element M3 selected from luminescent transition metal elements, and fluorine.

In the first non-aqueous solution, the second non-aqueous solution, or the third non-aqueous solution, the first ion may be at least one cation selected from the group consisting of at least one first element M1 selected from the group consisting of alkali metal elements, and ammonium; the first complex ion may be a first fluoride complex ion containing at least one second element M2 selected from the group consisting of Si, Ge, Sn, Ti, Zr, Al, Ga, In, Sc, Hf, La, Nb, Ta, Bi, and Gd, and fluorine; the third element may be Mn; and the second complex ion may be a second fluoride complex ion containing Mn and fluorine.

Non-Aqueous Organic Liquid

As a liquid medium to be mixed with the first non-aqueous solution, the second non-aqueous solution, or the third non-aqueous solution, a non-aqueous organic liquid having a hydrogen fluoride content of less than 20% by mass is prepared. Hereinafter, the non-aqueous organic liquid having a hydrogen fluoride content of less than 20% by mass is also referred to as a "non-aqueous organic liquid". Also, a mixture of the first non-aqueous solution, the second non-aqueous solution, and the non-aqueous organic liquid, as well as a mixture of the third non-aqueous solution and the non-aqueous organic liquid are also referred to as a non-aqueous liquid mixture, respectively. The content of hydrogen fluoride in the non-aqueous organic liquid may be an amount capable of obtaining an inorganic fluoride luminescent material in the non-aqueous liquid mixture. Specifically, the content of hydrogen fluoride in the non-aqueous organic liquid may be an amount capable of precipitating an inorganic fluoride luminescent material in the non-aqueous liquid mixture. The content of hydrogen fluoride in the non-aqueous organic liquid capable of precipitating an inorganic fluoride luminescent material in the non-aqueous liquid mixture is less than 20% by mass. The content of hydrogen fluoride in the non-aqueous organic liquid may be less than 20% by mass, may be 10% by mass or less, may be 5% by mass or less, may be 3% by mass or less, and may be 1% by mass or less; and the non-aqueous organic liquid may have a hydrogen fluoride content of 0% by mass, and may substantially contain no hydrogen fluoride. The non-aqueous organic liquid substantially containing no hydrogen fluoride refers to a non-aqueous organic liquid having a fluorine content of less than 1% by mass. The non-aqueous organic liquid preferably contains at least one selected from the group consisting of nitriles, ketones, amines, amides, nitrogen-containing heterocyclic compounds, fluoro-compounds, ethers, esters, alcohols, and mixtures of these. The non-aqueous organic liquid may be at least one selected from the group consisting of nitriles, ketones, amines, amides, nitrogen-containing heterocyclic compounds, fluoro-compounds, ethers, esters, alcohols, and mixtures of these.

Examples of the nitriles include acetonitrile, propionitrile, benzonitrile, acrylonitrile, and methacrylonitrile.

Examples of the ketones include acetone, methyl ethyl ketone, methyl isobutyl ketone, diisobutyl ketone, and cyclohexanenone. Examples of the ketone-based compounds having a hydroxyl group (alcohol) as a functional group include diacetone alcohol.

Examples of the fluoro-compounds include 1,1,2,2-tetrafluoroethylene, 2,2,3,3-tetrafluoropropyl ether, perfluorocarbon, hydrochlorofluorocarbon, hydrofluorocarbon, and hydrofluoroether.

Examples of the amines, the amides, the nitrogen-containing heterocyclic compounds, the ethers, the esters, and the alcohols include compounds exemplified as the compounds used in the non-aqueous hydrogen fluoride-containing liquid, respectively. The compounds such as the amines, the amides, the nitrogen-containing heterocyclic compounds, the ethers, the esters, and the alcohols may be the same as or different from those used in the non-aqueous hydrogen fluoride-containing liquid, respectively.

Mixing

The prepared first non-aqueous solution and the second non-aqueous solution, or the third non-aqueous solution can be brought into contact with the non-aqueous organic liquid having a hydrogen fluoride content of less than 20% by mass for mixing. As the method for contacting the first non-aqueous solution and the second non-aqueous solution with the non-aqueous organic liquid, the second non-aqueous solution and the non-aqueous organic liquid may be separately added dropwise to the first non-aqueous solution for mixing. The first non-aqueous solution and the non-aqueous organic liquid may be separately added dropwise to the second non-aqueous solution for mixing. The first non-aqueous solution and the second non-aqueous solution may be separately added dropwise to the non-aqueous organic liquid for mixing. The first non-aqueous solution and the second non-aqueous solution may be mixed to form a third non-aqueous solution. As the method for contacting the third non-aqueous solution with the non-aqueous organic liquid, the non-aqueous organic liquid may be added dropwise to the third non-aqueous solution for mixing, or the third non-aqueous solution may be added dropwise to the non-aqueous organic liquid for mixing. The liquid to be dropped is preferably stirred. In the case where the non-aqueous organic liquid is added dropwise to the first non-aqueous solution and the second non-aqueous solution, or the third non-aqueous solution for mixing, the dropping amount of the non-aqueous organic liquid may be in a range of 0.083% by volume or more and 100% by volume or less, may be in a range of 4% by volume or more and 25% by volume or less, and may be in a range of 8% by volume or more and 12% by volume or less, per minute, relative to the total amount of the first non-aqueous solution and the second non-aqueous solution, or the amount of the third non-aqueous solution.

The first non-aqueous solution, the second non-aqueous solution, and the non-aqueous organic liquid, or the third non-aqueous solution and the non-aqueous organic liquid may be mixed using a batch-type reactor to obtain a non-aqueous liquid mixture. In the case where the first non-aqueous solution and the second non-aqueous solution, or the third non-aqueous solution is added dropwise to the non-aqueous organic liquid for mixing, the total dropping amount of the first non-aqueous solution and the second non-aqueous solution, or the dropping amount of the third non-aqueous solution may be in a range of 0.083% by volume or more and 100% by volume or less, per minute, relative to the amount of the non-aqueous organic liquid. In the case of using a batch-type reactor, depending on the concentrations of the first ion, the second ion, and the third ion, the volume ratio of the non-aqueous organic liquid to the total amount of the first non-aqueous solution and the second non-aqueous solution, or the amount of the third non-aqueous solution is preferably 9:1 or more and 1:9 or less, and more preferably 6:4 or more and 4:6 or less.

In the case of using a batch-type reactor, the first non-aqueous solution, the second non-aqueous solution, and the non-aqueous organic liquid, or the third non-aqueous solution and the non-aqueous organic liquid may be mixed by stirring. The method for stirring the non-aqueous liquid mixture may be a method in which the concentration gradient of each component contained in the mixture of the non-aqueous solution can be relaxed. Examples of the stirring method include a method of rotating a stirrer at a constant speed, a method of pressurizing a non-aqueous liquid mixture with a pump to generate a flow, and a method of using a mechanical stirrer. The non-aqueous liquid mixture may be stirred continuously or intermittently. In the case of stirring intermittently, the interval at which the stirring is interrupted is not limited, and the stirring may be performed at a regular time and stopped at a regular time, or may be performed at an irregular time and stopped at an irregular time. In the case of stirring intermittently at a regular time, for example, the stirring may be performed for 1 to 30 minutes and stopped for 1 to 30 minutes.

The first non-aqueous solution, the second non-aqueous solution, and the non-aqueous organic liquid, or the third non-aqueous solution and the non-aqueous organic liquid may be mixed by a continuous flow process using a continuous flow-type reactor to obtain a non-aqueous liquid mixture. The reactor using the continuous flow process uses a micro-flow channel to bring the first non-aqueous solution, the second non-aqueous solution, and the non-aqueous organic liquid, or the third non-aqueous solution and the non-aqueous organic liquid into contact with each other for mixing. The flow rate of the micro-flow channel of each of the first non-aqueous solution, the second non-aqueous solution, the third non-aqueous solution, and the non-aqueous organic liquid is preferably in a range of 1 mL/min or more and 1,000 mL/min or less, and more preferably 10 mL/min or more and 50 mL/min or less. In the case of using a reactor using the continuous flow process, depending on the concentrations of the first ion, the second ion, and the third ion, the volume ratio of the non-aqueous organic liquid to the total amount of the first non-aqueous solution and the second non-aqueous solution, or the amount of the third non-aqueous solution is preferably 1:9 or more and 9:1 or less, and more preferably 6:4 or more and 4:6 or less.

The first non-aqueous solution, the second non-aqueous solution, and the non-aqueous organic liquid, or the third non-aqueous solution and the non-aqueous organic liquid can be mixed in a temperature range of, for example, 0° C.

or higher and 110° C. or lower, may be mixed in a temperature range of 15° C. or higher and 40° C. or lower, and may be mixed in a temperature range of 23° C. or higher and 28° C. or lower. The atmosphere in which the non-aqueous liquid mixture is mixed may be, for example, a normal atmospheric atmosphere or an inert gas atmosphere such as nitrogen gas.

The first non-aqueous solution, the second non-aqueous solution, and the non-aqueous organic liquid, or the third non-aqueous solution and the non-aqueous organic liquid can be mixed to obtain an inorganic fluoride luminescent material containing the first element M1 or ammonium, the second element M2, and the third element M3 in the resulting non-aqueous liquid mixture. Specifically, an inorganic fluoride luminescent material containing the first element M1 or ammonium, the second element M2, and the third element M3 can be precipitated as a precipitate or the like in the non-aqueous liquid mixture. The obtained inorganic fluoride luminescent material may be subjected to post-treatments such as a separation treatment from the non-aqueous liquid mixture, a washing treatment, and a drying treatment. The washing treatment can be performed using a non-aqueous organic liquid. The drying treatment can be performed by an industrially commonly used device or method such as a vacuum dryer, a heat dryer, a conical dryer, and a rotary evaporator. The drying temperature in the heat-drying treatment may be a temperature at which the liquid attached to the inorganic fluoride luminescent material evaporates; and is usually 40° C. or higher, preferably 50° C. or higher, and is usually 100° C. or lower, preferably 70° C. or lower. The drying time may be a time in which the liquid attached to the inorganic fluoride luminescent material evaporates, and is, for example, approximately 8 hours.

Examples of the inorganic fluoride luminescent material obtained by the production method according to the present disclosure include fluoride crystals such as $LiYF_4$ (hereinafter, also referred to as "YLF"), $LiLuF_4$, $BaY_2F_8$, and $KY_3F_{10}$ containing at least one rare earth element selected from the group consisting of Tm, Ho, Pr, Er, and Yb as the third element M3; ZBLAN ($ZrF_4$—$BaF_2$—$LaF_3$—$AlF_3$—NaF) glass fibers containing $ZrF_4$ as a main component, and containing at least one rare earth element selected from the group consisting of Pr, Nd, Ho, Er, Dy, Tm, and Yb as the third element M3; and $AlF_3$-based glass fibers ($AlF_3$—$BaF_2$—$SrF_2$—$CaF_2$—$MgF_2$—$YF_3$) containing $AlF_3$ as a main component, and containing the rare earth element as the third element M3. Among the inorganic fluoride luminescent materials obtained by the production method according to the present disclosure, fluoride crystals having a composition represented by YLF, $LiLuF_4$, $BaY_2F_8$, or $KY_3F_{10}$, ZBLAN glass fibers, and $AlF_3$-based glass fibers can be used as fiber lasers and laser media for fiber amplifiers. The inorganic fluoride luminescent material obtained by the production method according to the present disclosure is produced using a non-aqueous solution, and thus has optical characteristics that are less affected by hydroxide ions ($OH^-$) or water.

The inorganic fluoride luminescent material obtained by the method of the present disclosure is preferably an inorganic fluoride fluorescent material having a composition represented by the following formula (I).

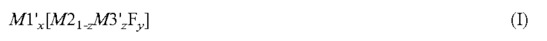

$$M1'_x[M2_{1-z}M3'_zF_y] \quad (I)$$

wherein M1' represents at least one cation selected from the group consisting of $Li^+$, $Na^+$, $K^+$, $Rb^+$, $Cs^+$, $Fr^+$, $Be^{2+}$, $Mg^{2+}$, $Ca^{2+}$, $Sr^{2+}$, $Ba^{2+}$, $Ra^{2+}$, and $NH_4^+$; M2 represents at least one element selected from the group consisting of non-luminescent transition metal elements, Group 13 elements, Group 14 elements, and Group 15 elements; M3' represents $Mn^{4+}$; x is an absolute value of an electric charge of the $[M2_{1-z}M3'_zF_y]$ ion; and y and z satisfy $5 \leq y \leq 7$ and $0<z<0.2$, respectively.

Since the inorganic fluoride fluorescent material obtained by the production method according to the present disclosure is produced using a non-aqueous solution, it is possible to maintain excellent light emission characteristics without being affected by hydroxide ions ($OH^-$) or water. In the inorganic fluoride fluorescent material produced using a non-aqueous solution by the method of the present disclosure, tetravalent manganese, which is the center of light emission, is difficult to be reduced to trivalent manganese by hydroxide ions ($OH^-$) or water, and the valence of manganese contained in the fluorescent material can be maintained as tetravalent, thereby maintaining excellent light emission characteristics.

In the formula (I), M1' is preferably at least one cation selected from the group consisting of $Li^+$, $K^+$, $Na^+$, and $NH_4$+, and more preferably $K^+$.

In the formula (I), M2 is preferably at least one element selected from the group consisting of Sc, Ti, Y, Zr, Hf, Ta, Si, Ge, Sn, and Pb, more preferably at least one element selected from the group consisting of Si, Ge, Sn, Ti, Zr, and Hf, even more preferably at least one element selected from the group consisting of Si, Ge, Ti, and Zr, and most preferably Si.

In the formula (I), M3' is $Mn^{4+}$, which represents an activating element that contributes to light emission of the inorganic fluoride fluorescent material having the composition represented by the formula (I). In the formula (I), the parameter z represents the molar ratio of $Mn^{4+}$, which is an activating element in the composition represented by the formula (I). In the formula (I), the parameter z is a number in a range of more than 0 and less than 0.2 ($0<z<0.2$), preferably a number in a range of 0.005 or more and 0.15 or less ($0.005 \leq z \leq 0.15$), more preferably a number in a range of 0.010 or more and 0.100 or less ($0.010 \leq z \leq 0.100$), and even more preferably a number in a range of 0.015 or more and 0.090 or less ($0.015 \leq z \leq 0.090$).

The inorganic fluoride fluorescent material having the composition represented by the formula (I) is activated by $Mn^{4+}$ to absorb light in the short wavelength region of visible light, thereby emitting red light. The excitation light, which is light in the short wavelength region of visible light, is preferably light mainly in the blue region. Specifically, the excitation light irradiated to the inorganic fluoride fluorescent material having the composition represented by the formula (I) is preferably present in a range where the excitation peak wavelength of the excitation spectrum is 380 nm or more and 485 nm or less. The light emission spectrum of the inorganic fluoride fluorescent material having the composition represented by the formula (I) preferably has a peak wavelength in a range of 610 nm or more and 650 nm or less. The numerical value of the full width at half maximum of the light emission spectrum of the inorganic fluoride fluorescent material having the composition represented by the formula (I) is preferably small, specifically 10 nm or less. The full width at half maximum refers to a full width at half maximum (FWHM) of the light emission peak in the light emission spectrum, and means a wavelength width of the light emission peak at 50% of the maximum value of the light emission peak in the light emission spectrum.

The inorganic fluoride fluorescent material having a composition represented by the formula (I) can be used in an illumination device and a light emitting device to be used in backlight for liquid crystal display devices, in combination with an excitation light source such as an LED or LD.

As the excitation light source used in the light emitting device, an excitation light source that emits light in a wavelength range of 400 nm or more and 570 nm or less can be used. By using an excitation light source having the wavelength range, a light emitting device having high light emission intensity can be provided. The light emitting element to be used as the excitation light source for the light emitting device preferably has a light emission peak wavelength in a range of 420 nm or more and 500 nm or less, and more preferably in a range of 420 nm or more and 460 nm or less.

As the light emitting element, a semiconductor light emitting element using a nitride-based semiconductor ($In_XAl_YGa_{1-X-Y}N$, 0≤X, 0≤Y, X+Y≤1) is preferably used. By using a semiconductor light emitting element as the excitation light source for the light emitting device, a stable light emitting device having high efficiency, high output linearity with respect to input, and high resistance to mechanical impacts can be obtained. The full width at half maximum of the light emission spectrum of the light emitting element is preferably, for example, 30 nm or less.

The light emitting device may use an inorganic fluoride fluorescent material having a composition represented by, for example, the formula (I). It may use an inorganic fluoride fluorescent material having a composition represented by, for example, the formula (I) as a first fluorescent material, and a second fluorescent material having a light emission peak wavelength different from that of the first fluorescent material. As the first fluorescent material, one type of fluorescent material may be used alone, and two or more types of fluorescent materials may be used in combination, as long as the fluorescent material has a light emission peak wavelength within a target wavelength range. As the second fluorescent material, one type of fluorescent material may be used alone, and two or more types of fluorescent materials may be used in combination, as long as the fluorescent material has a light emission peak wavelength within a target wavelength range.

Figure 3:
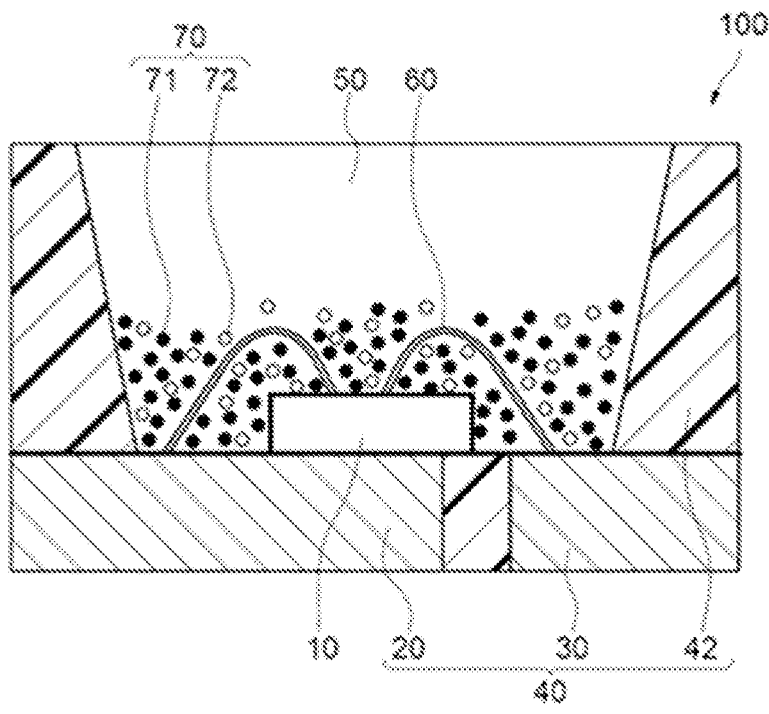
FIG. 3 is a schematic cross-sectional view showing an exemplary light emitting device using an inorganic fluoride fluorescent material.

An example of the light emitting device will be described with reference to the drawings. FIG. 3 is a schematic cross-sectional view showing an example of the light emitting device. The light emitting device is an example of a surface-mount light emitting device.

A light emitting device 100 includes a package 40 having a recessed portion formed by lead electrodes 20 and 30 and a molded body 40, a light emitting element 10, and a sealing member 50 that covers the light emitting element 10. The light emitting element 10 is arranged in the recessed portion of the package 40, and is electrically connected to the pair of positive and negative lead electrodes 20 and 30 provided in the package 40 via a conductive wire 60. The sealing member 50 is filled in the recessed portion to cover the light emitting element 10, and seals up the recessed portion. The sealing member 50 contains, for example, a florescent material 70 that converts the wavelength of light emitted from the light emitting element 10, and a resin. The fluorescent material 70 contains a first fluorescent material 71 and a second fluorescent material 72. Apart of the pair of positive and negative lead electrodes 20 and 30 is exposed on the outer surface of the package 40. The light emitting device 100 emits light by receiving electric power supplied from the outside through these lead electrodes 20 and 30.

The sealing member 50 contains a resin and a fluorescent material 70, and is formed to cover the light emitting element 10 arranged in the recessed portion of the light emitting device 100.

EXAMPLES

The present invention will be hereunder specifically described by reference to the following Examples. The present invention is not limited to these Examples.

Example 1

Potassium hexafluorosilicate ($K_2SiF_6$) containing K as the first element M1 and Si as the second element M2 in an amount of 10.0 g was weighed, and dissolved in 85 mL of a pyridine-HF complex solution, as the first non-aqueous hydrogen fluoride-containing liquid, containing 70% by mass of hydrogen fluoride and 30% by mass of pyridine, to prepare a first non-aqueous solution. The first ion in the first non-aqueous solution was $K^+$, the second ion was $Si^{4+}$, and the first complex ion was $SiF_6^{2-}$, which was a first fluoride complex ion containing the second element M2 and fluorine. The concentration of the first ion was 3.43% by mass, the concentration of the second ion was 1.24% by mass, and the concentration of the first complex ion was 6.23% by mass, relative to 100% by mass of the first non-aqueous solution.

Potassium hexafluoromanganate ($K_2MnF_6$) containing Mn as the third element M3 in an amount of 570 mg was weighed, and dissolved in 5 mL of a pyridine-HF complex solution, as the second non-aqueous hydrogen fluoride-containing liquid, containing 70% by mass of hydrogen fluoride and 30% by mass of pyridine, to prepare a second non-aqueous solution. The first ion in the second non-aqueous solution was $K^+$, the third ion was $Mn^{4+}$, and the second complex ion was $MnF_6^{2-}$, which was a second fluoride complex ion containing the third element M3 and fluorine. The concentration of the first ion was 2.97% by mass, the concentration of the third ion was 2.09% by mass, and the concentration of the second complex ion was 6.42% by mass, relative to 100% by mass of the first non-aqueous solution.

As a non-aqueous organic liquid, 100 mL of acetonitrile containing substantially no hydrogen fluoride and having a hydrogen fluoride content of substantially 0% by mass, was prepared.

The first non-aqueous solution containing K, Si, and fluorine was mixed with the second non-aqueous solution containing K, Mn, and fluorine, and while stirring the mixture of the first non-aqueous solution and the second non-aqueous solution at a temperature controlled from 23° C. to 27° C., 100 mL of acetonitrile, which was the non-aqueous organic liquid, was added dropwise to the mixture over approximately 100 minutes, to obtain a precipitate that was precipitated in the non-aqueous liquid mixture. The volume ratio of the non-aqueous organic liquid to the total amount of the first non-aqueous solution and the second non-aqueous solution was 4.7:5.3. The resulting precipitate was subjected to solid-liquid separation, washed with acetonitrile, then washed with isopropanol, and vacuum dried at 25° C. for 8 hours to obtain an inorganic fluoride fluorescent material of Example 1 having a composition represented by $K_2[Si_{0.957}Mn^{4+}_{0.043}F_6]$. The Mn content (% by mass) in the inorganic fluoride fluorescent material of Example 1 measured by the measurement method described below was 1.07% by mass. It was presumed that when the inorganic fluoride fluorescent material of Example 1 was dissolved in a deuterated solvent and measured by nuclear magnetic resonance (proton NMR), pyridine, which was a component contained in the non-aqueous hydrogen fluoride-containing liquid, was detected from the inorganic fluoride fluorescent material of Example 1.

Comparative Example 1

Potassium hexafluoromanganate ($K_2MnF_6$) in an amount of 0.99 g and hexafluorosilicic acid ($H_2SiF_6$) in an amount of 34.58 g were weighed and dissolved in 100 mL of an HF aqueous solution containing 55% by mass of hydrogen fluoride and 45% by mass of deionized water, and 100 mL of deionized water was further added to prepare a first aqueous solution.

Potassium hydrogen fluoride ($KHF_2$) in an amount of 15.6 g was weighed and dissolved in 50 mL of an HF aqueous solution containing 55% by mass of hydrogen fluoride and 45% by mass of deionized water to prepare a second aqueous solution.

Then, while stirring the first aqueous solution at room temperature, the second aqueous solution was added dropwise thereto over approximately 10 minutes to obtain a precipitate. The resulting precipitate was subjected to solid-liquid separation, washed with ethanol, and dried at 110° C. for 8 hours to obtain an inorganic fluoride fluorescent material of Comparative Example 1 having a composition represented by $K_2[Si_{0.958}Mn^{4+}_{0.042}F_6]$. The Mn content (% by mass) in the inorganic fluoride fluorescent material of Comparative Example 1 measured by the measurement method described below was 1.03% by mass.

Evaluation and Result 1

Infrared Reflection Spectrum

Figure 4:
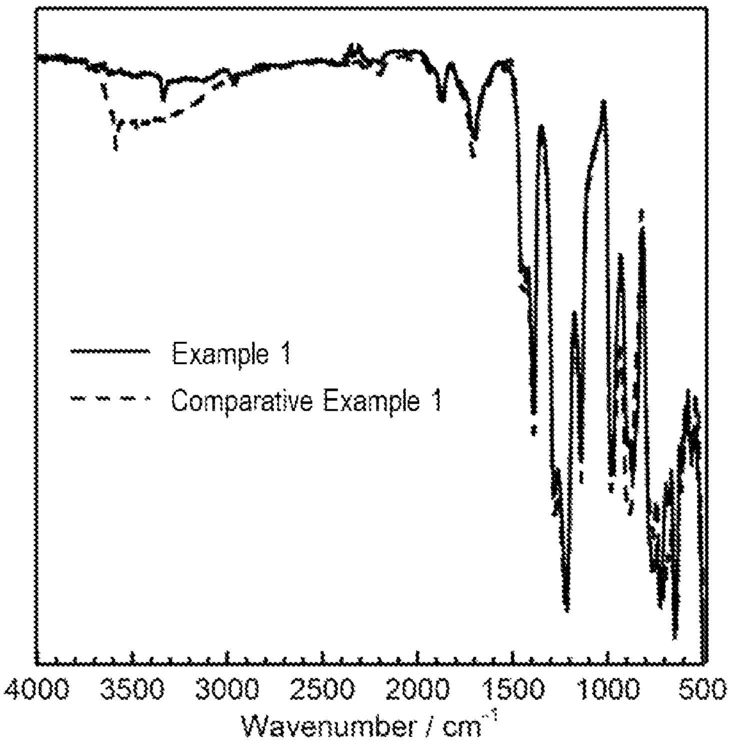
FIG. 4 is an exemplary graph showing infrared reflection spectra of inorganic fluoride fluorescent materials according to Example 1 and Comparative Example 1.

The infrared reflection spectrum in each of the obtained inorganic fluoride fluorescent materials was measured by a diffuse reflection method using a Fourier transform infrared spectrophotometer (FT/IR-6600, manufactured by JASCO corp.). FIG. 4 shows the infrared reflection spectra of the inorganic fluoride fluorescent materials according to Example 1 and Comparative Example 1.

Evaluation and Result 2

Mn Content and Internal Quantum Efficiency

The Mn content (% by mass) in each of the obtained inorganic fluoride fluorescent materials was measured using a high-frequency inductively coupled plasma (ICP) light emission spectrophotometer (PS3500DD-II, manufactured by Hitachi High-Tech Science Corp.). Further, using a quantum efficiency measuring apparatus (QE-2100, manufactured by Otsuka Electronics Co., Ltd.), each of the obtained inorganic fluoride fluorescent materials was excited by excitation light having a light emission peak wavelength of 450 nm to measure the light emission spectrum, and the internal quantum efficiency of the light emission of each inorganic fluoride fluorescent material was measured from the light emission spectrum in a range of 600 nm or more and 650 nm or less.

TABLE 1

| | Internal quantum efficiency (IQE) (%) |
|---|---|
| Example 1 | 96.0 |
| Comparative Example 1 | 91.8 |

In the inorganic fluoride fluorescent material according to Example 1 produced using the non-aqueous solution mixture, the reduction of the infrared reflection spectrum was suppressed in a wavenumber region from 2,500 to 4,000 $cm^{-1}$, compared with the inorganic fluoride fluorescent material according to Comparative Example 1 produced using the aqueous solution. The reduction of the infrared reflection spectrum in the wavenumber region from 2,500 to 4,000 $cm^{-1}$ indicated the presence of hydroxide ions ($OH^-$) or water, and the suppression of the reduction of the infrared reflection spectrum in the wavenumber region from 2,500 to 4,000 $cm^{-1}$ indicated that the inorganic fluoride fluorescent material according to Example 1 contained less hydroxide ions ($OH^-$) or water. The inorganic fluoride fluorescent material according to Example 1 had less hydroxide ions ($OH^-$) and water than the inorganic fluoride fluorescent material according to Comparative Example 1, which suppressed the decrease in optical characteristics due to hydroxide ions ($OH^-$) or water.

The inorganic fluoride fluorescent material according to Example 1 produced using the non-aqueous solution mixture had less hydroxide ions ($OH^-$) and water, and the tetravalent manganese, which was center of light emission, was maintained without being reduced to trivalent. Therefore, the inorganic fluoride fluorescent material according to Example 1 had higher internal quantum efficiency than that of the inorganic fluoride fluorescent material according to Comparative Example 1 produced using the aqueous solution, and had excellent light emission characteristics.

Evaluation and Result 3

Ultraviolet Visible Reflection Spectrum

Figure 5:
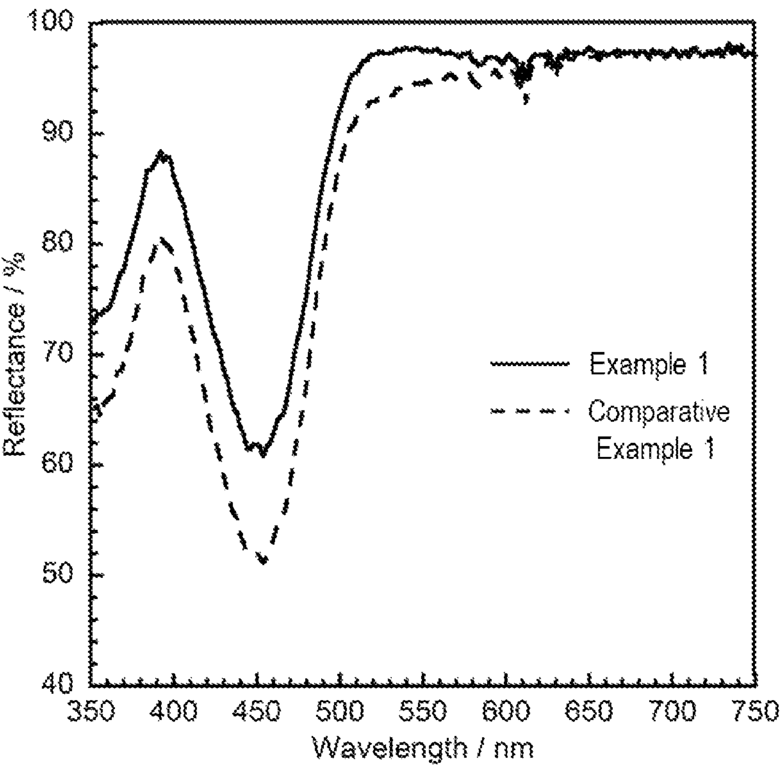
FIG. 5 is an exemplary graph showing ultraviolet visible reflection spectra of inorganic fluoride fluorescent materials according to Example 1 and Comparative Example 1.

The ultraviolet visible reflection spectrum in each of the obtained inorganic fluoride fluorescent materials was measured using an ultraviolet visible near-infrared spectrophotometer (U-4100, manufactured by Hitachi High-Tech Science Corp.). FIG. 5 shows the ultraviolet visible reflection spectra of the inorganic fluoride fluorescent materials according to Example 1 and Comparative Example 1.

It was confirmed that the ultraviolet visible reflection spectrum of the inorganic fluoride fluorescent material according to Example 1 produced using the non-aqueous solution mixture had higher reflectance in a wavelength range from 500 to 600 nm than that of the ultraviolet visible reflection spectrum of the inorganic fluoride fluorescent material according to Comparative Example 1 produced using the aqueous liquid. In the ultraviolet visible reflection spectrum of the inorganic fluoride fluorescent material according to Example 1, the reduction of the reflectance in the ultraviolet visible reflection spectrum in the wavelength range from 500 to 600 nm indicated the presence of $Mn^{3+}$ not contributing to light emission. The ultraviolet visible reflection spectrum of the inorganic fluoride fluorescent material according to Example 1 had higher reflectance in the wavelength range from 500 to 600 nm than that of the ultraviolet visible reflection spectrum of the inorganic fluoride fluorescent material according to Comparative Example 1. This indicated that the amount of $Mn^{3+}$ not contributing to light emission was small, and the amount of $Mn^{4+}$ contributing to light emission was large, relatively. From the ultraviolet visible reflection spectrum of the inorganic fluoride fluorescent material according to Example 1, the inorganic fluoride fluorescent material according to Example 1 had less $Mn^{3+}$ not contributing to light emission and relatively more $Mn^{4+}$ contributing to light emission than the inorganic fluoride fluorescent material according to Comparative Example 1, and had excellent light emission characteristics.

Evaluation and Results 4 and 5

Excitation Spectrum and Light Emission Spectrum

Figure 6:
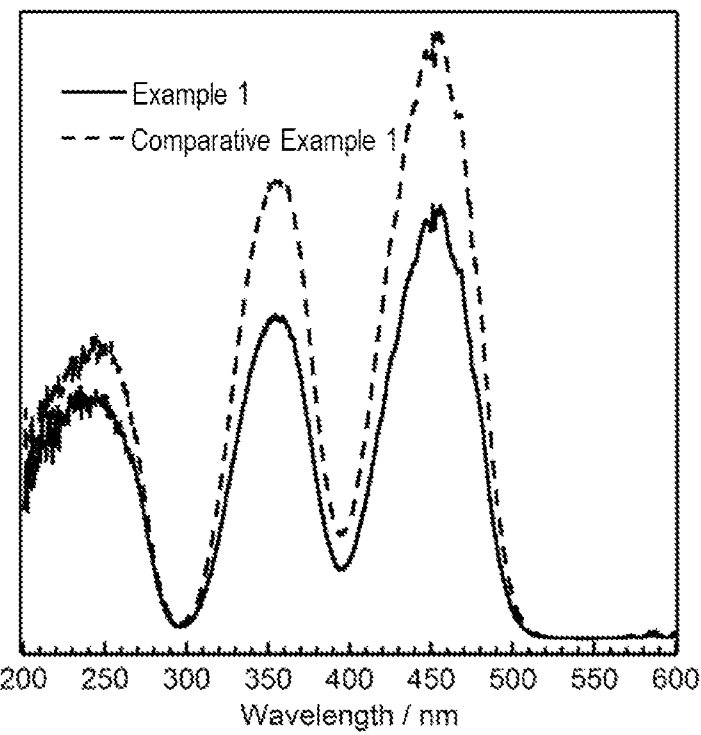
FIG. 6 is an exemplary graph showing excitation spectra of inorganic fluoride fluorescent materials according to Example 1 and Comparative Example 1.
Figure 7:
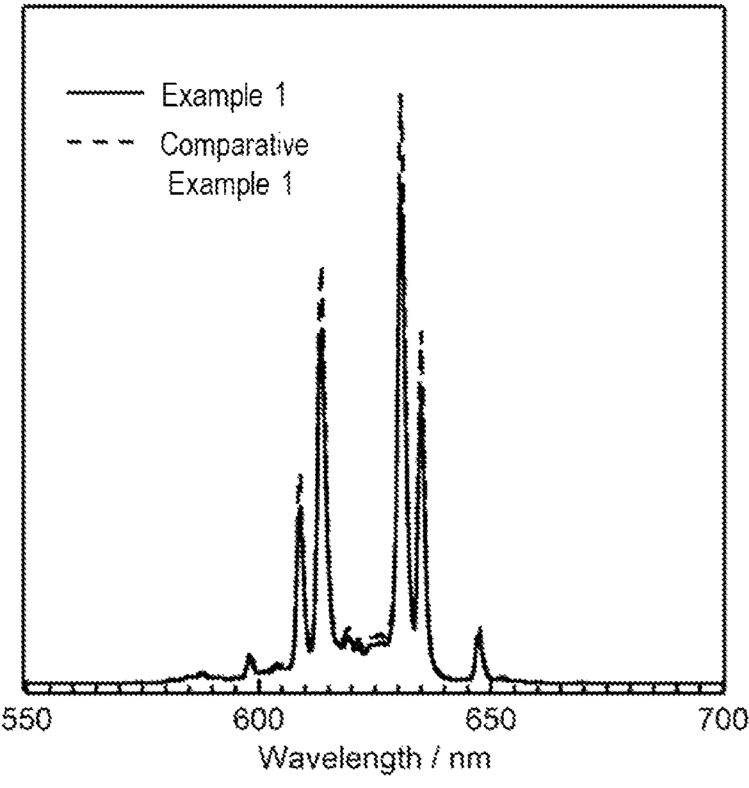
FIG. 7 is an exemplary graph showing light emission spectra of inorganic fluoride fluorescent materials according to Example 1 and Comparative Example 1.

The excitation spectrum and the light emission spectrum in each of the obtained fluoride fluorescent materials were measured using a spectrofluorophotometer (FP-8500DS, manufactured by JASCO corp.). FIG. 6 shows the excitation spectra of the inorganic fluoride fluorescent materials according to Example 1 and Comparative Example 1. FIG. 7 shows the light emission spectra of the inorganic fluoride fluorescent materials according to Example 1 and Comparative Example 1.

It was confirmed that the inorganic fluoride fluorescent material according to Example 1 produced using the non-aqueous solution mixture and the inorganic fluoride fluorescent material according to Comparative Example 1 produced using the aqueous solution each had peaks in the excitation spectrum at 350 nm and 450 nm, and high absorption of excitation light at approximately the same wavelengths.

The inorganic fluoride fluorescent material according to Example 1 produced using the non-aqueous solution mixture and the inorganic fluoride fluorescent material according to Comparative Example 1 produced using the aqueous solution each had approximately the same light emission spectrum and a sharp emission spectrum with a narrow full width at half maximum.

INDUSTRIAL APPLICABILITY

The inorganic fluoride luminescent materials obtained by the production method of the present disclosure can be used as fiber lasers, laser media for fiber amplifiers, and fluorescent materials. Among the inorganic fluoride luminescent materials obtained by the production method of the present disclosure, the inorganic fluoride fluorescent material can be suitably used in various applications such as illumination light sources using a light emitting diode as an excitation light source, light sources for LED displays or liquid crystal backlight applications, traffic signals, illumination switches, various sensors, various indicators, and small strobes.

EXPLANATIONS OF LETTERS OR NUMERALS

10: Light emitting element, 20, 30: Lead electrodes, 40: Package, 42: Molded body, 50: Sealing member, 60: Wire, 70: Fluorescent material, 71: First fluorescent material, 72: Second fluorescent material, and 100: Light emitting device.

What is claimed is:

1. A method for producing an inorganic fluoride luminescent material comprising:

either preparing a first non-aqueous solution that comprises at least one first ion containing at least one selected from the group consisting of a first element M1 and ammonium, at least one second ion containing a second element M2 other than the first element M1, and a first non-aqueous hydrogen fluoride-containing liquid having a hydrogen fluoride content in a range of 20% by mass or more and 100% by mass or less, and a second non-aqueous solution that comprises a third ion containing a third element M3 other than the first element M1 and the second element M2, and a second non-aqueous hydrogen fluoride-containing liquid having a hydrogen fluoride content in a range of 20% by mass or more and 100% by mass or less; or preparing a third non-aqueous solution that comprises at least one first ion containing at least one selected from the group consisting of a first element M1 and ammonium, at least one second ion containing a second element M2 other than the first element M1, a third ion containing a third element M3 other than the first element M1 and the second element M2, and a third non-aqueous hydrogen fluoride-containing liquid having a hydrogen fluoride content in a range of 20% by mass or more and 100% by mass or less;

either mixing the first non-aqueous solution and the second non-aqueous solution with a non-aqueous organic liquid having a hydrogen fluoride content of less than 20% by mass, or mixing the third non-aqueous solution with a non-aqueous organic liquid having a hydrogen fluoride content of less than 20% by mass, to precipitate an inorganic fluoride luminescent material containing the first element M1 and/or ammonium, the second element M2, and the third element M3 as a precipitate; and drying the precipitate at a drying temperature, wherein the first element M1 comprises at least one element selected from the group consisting of alkali metal elements and alkaline earth metal elements, wherein the second element M2 comprises at least one element selected from the group consisting of non-luminescent transition metal elements, Group 12 elements, Group 13 elements, Group 14 elements, and Group 15 elements, wherein the third element M3 comprises at least one element selected from luminescent transition metal elements, wherein the mixing of the first non-aqueous solution, the second non-aqueous solution and the non-aqueous organic liquid, or the mixing of the third non-aqueous solution and the non-aqueous organic liquid is performed at a mixing temperature in a range of 15° C. or higher and 40° C. or lower, and wherein the drying temperature is lower than the upper limit of the mixing temperature.

2. The method for producing an inorganic fluoride luminescent material according to claim 1, wherein the first non-aqueous hydrogen fluoride-containing liquid, the second non-aqueous hydrogen fluoride-containing liquid, or the third non-aqueous hydrogen fluoride-containing liquid comprises at least one selected from the group consisting of nitrogen-containing heterocyclic compounds, amines, ureas, amides, carbamic acids, trialkylphosphines, ethers, esters, alcohols, and quaternary ammonium salts.

3. The method for producing an inorganic fluoride luminescent material according to claim 1, wherein the non-aqueous organic liquid comprises at least one selected from the group consisting of nitriles, ketones, amines, amides, nitrogen-containing heterocyclic compounds, fluoro-compounds, ethers, esters, alcohols, and mixtures of these.

4. The method for producing an inorganic fluoride luminescent material according to claim 1, wherein the first element M1 comprises at least one element selected from the group consisting of Li, Na, K, Rb, Cs, Fr, Be, Mg, Ca, Sr, Ba, and Ra.

5. The method for producing an inorganic fluoride luminescent material according to claim 1, wherein the first ion comprises a cation composed of the first element M1 or ammonium.

6. The method for producing an inorganic fluoride luminescent material according to claim 1, wherein the second element M2 comprises at least one element selected from the group consisting of Sc, Ti, Y, Zr, Nb, La, Gd, Hf, Ta, Zn, Cd, Hg, Al, Ga, In, Tl, Si, Ge, Sn, Pb, As, Sb, and Bi.

7. The method for producing an inorganic fluoride luminescent material according to claim 1, wherein the second ion comprises a cation composed of the second element M2 or a first complex ion containing the second element M2 and fluorine.

8. The method for producing an inorganic fluoride luminescent material according to claim 6, wherein the second element M2 comprises at least one element selected from the group consisting of Sc, Ti, Y, Zr, Nb, La, Gd, Hf, and Ta.

9. The method for producing an inorganic fluoride luminescent material according to claim 1, wherein the third ion comprises a cation composed of the third element M3 or a second complex ion containing the third element M3 and fluorine.

10. The method for producing an inorganic fluoride luminescent material according to claim 1, wherein the luminescent transition metal elements comprise at least one element selected from the group consisting of Mn, Ce, Pr, Nd, Pm, Sm, Eu, Tb, Dy, Ho, Er, Tm, Yb, and Lu.

11. The method for producing an inorganic fluoride luminescent material according to claim 1, wherein the first ion comprises at least one cation selected from the group consisting of the at least one first element M1 selected from the group consisting of alkali metal elements, and ammonium;

the second ion comprises a first complex ion containing the at least one second element M2 selected from the group consisting of non-luminescent transition metal elements, Group 13 elements, Group 14 elements, and Group 15 elements, and fluorine; and the third ion comprises a second complex ion containing the at least one third element M3 selected from luminescent transition metal elements, and fluorine.

12. The method for producing an inorganic fluoride luminescent material according to claim 11, wherein the first complex ion comprises a first fluoride complex ion containing the at least one second element M2 selected from the group consisting of Si, Ge, Sn, Ti, Zr, Al, Ga, In, Sc, Hf, La, Nb, Ta, Bi, and Gd, and fluorine;

the third element comprises Mn; and the second complex ion comprises a second fluoride complex ion containing Mn and fluorine.

13. The method for producing an inorganic fluoride luminescent material according to claim 1, wherein the obtained inorganic fluoride luminescent material comprises a composition represented by the following formula (I):

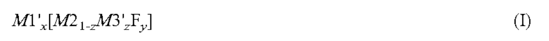

$$M1'_x[M2_{1-z}M3'_zF_y] \quad (I)$$

wherein M1' represents at least one cation selected from the group consisting of $Li^+$, $Na^+$, $K^+$, $Rb^+$, $Cs^+$, and $NH_4^+$; M2 represents at least one element selected from the group consisting of non-luminescent transition metal elements, Group 13 elements, Group 14 elements, and Group 15 elements; M3' represents $Mn^{4+}$; x is an absolute value of an electric charge of the $[M2_{1-z}M3'_zF_y]$ ion; and y and z satisfy $5 \leq y \leq 7$ and $0<z<0.2$, respectively.

14. The method for producing an inorganic fluoride luminescent material according to claim 1, comprising either mixing the first non-aqueous solution and the second non-aqueous solution with the non-aqueous organic liquid, or mixing the third non-aqueous solution with the non-aqueous organic liquid, using a batch-type reactor.

15. The method for producing an inorganic fluoride luminescent material according to claim 1, comprising either mixing the first non-aqueous solution and the second non-aqueous solution with the non-aqueous organic liquid, or mixing the third non-aqueous solution with the non-aqueous organic liquid, using a continuous flow-type reactor.

16. The method for producing an inorganic fluoride luminescent material according to claim 1, wherein the mixing of the first non-aqueous solution, the second non-aqueous solution and the non-aqueous organic liquid, or the mixing of the third non-aqueous solution and the non-aqueous organic liquid is performed at the mixing temperature in a range of 23° C. or higher and 28° C. or lower.

* * * * *